United States Patent [19]

Sturgeon

[11] 4,285,494

[45] Aug. 25, 1981

[54] ENGINE AIR CUT-OFF DEVICE

[75] Inventor: Leonard A. Sturgeon, Edmonton, Canada

[73] Assignee: Bralorne Resources Limited, Calgary, Canada

[21] Appl. No.: 155,684

[22] Filed: Jun. 2, 1980

Related U.S. Application Data

[62] Division of Ser. No. 842,691, Oct. 17, 1977, Pat. No. 4,215,845.

[30] Foreign Application Priority Data

Dec. 16, 1976 [CA] Canada .................................. 268047

[51] Int. Cl.³ .......................... F16K 3/00; F02B 77/00
[52] U.S. Cl. ..................................... 251/63; 251/327; 251/85; 123/198 F
[58] Field of Search .......................... 251/63, 327, 85; 123/198 F, 198 D, 198 DB; 92/132

[56] References Cited

U.S. PATENT DOCUMENTS

| | | | |
|---|---|---|---|
| 1,347,192 | 7/1920 | Tygard et al. | 123/198 DB |
| 2,361,225 | 10/1944 | Meyer | 251/63 |
| 2,839,265 | 6/1958 | Hobbs | 251/85 |
| 3,452,935 | 7/1969 | Herold | 251/63 |
| 3,490,341 | 1/1970 | Sessody | 92/132 |
| 4,215,845 | 8/1980 | Sturgeon | 251/63 |

FOREIGN PATENT DOCUMENTS 788333 6/1968 Canada .
622473 5/1927 France ........................................ 92/132

Primary Examiner—Martin P. Schwadron
Assistant Examiner—A. Michael Chambers
Attorney, Agent, or Firm—H. Wayne Rock

[57] ABSTRACT

The present invention provides an engine air cut-off device which can be connected into the manifold air passage of an internal combustion engine. The device includes a valve body having a passage therethrough which is alignable with the manifold air passage, the valve body incorporating a gate which is reciprocally mounted therein for movement between a retracted position in the body and a closed position which blocks the manifold air passage. The gate is provided with at least one integrally formed cylindrical bore which has a piston face at one end thereof. Means are provided in the valve body for introducing fluid underpressure into the cylindrical bore so that when the device is actuated the fluid under pressure will be introduced into the bore and will act against the piston face to drive the gate from its retracted to its closed position. Means are also provided for normally biasing the gate to its retracted position. The cut-off device of the present invention is very compact and is relatively simple to manufacture.

2 Claims, 7 Drawing Figures

ENGINE AIR CUT-OFF DEVICE

This is a division of application Ser. No. 842,691 filed Oct. 17, 1977 now U.S. Pat. No. 4,215,845, issued Aug. 5, 1980.

THE PRESENT INVENTION RELATES TO AN ENGINE AIR CUT-OFF DEVICE.

BACKGROUND OF THE INVENTION

It has been known in the past to provide fuel or air supply cut-off devices for engines. For instance during the drilling of an oil or gas well several operations are performed which may result in natural gas flowing into the enclosure around the operating engines and attaining high concentrations therein. Such natural gas could enter diesel engines through the air intake and, even though the fuel oil is shut off, the engine could continue to operate. This would create hazards such as sparks being emitted from the engine exhaust which could ignite the gas and air mixture around the engines and also the generous supply of fuel could cause the engine to attain excessive speeds which could be damaging to the engine itself. There have been prior attempts at providing engine air cut-off devices, for example, reference can be made to Canadian Patents Nos. 587,457 (Oakes, Nov. 24, 1959); 788,333 (Gordon, June 25, 1968); or 914,644 (Verheul, Nov. 14, 1972). The cut-off devices of these patents are probably effective in their own right but each involves a structure which is large and unwieldy and which necessitates a relatively complex actuation structure. In many instances external actuation via a hydraulic or pneumatic cylinder is utilized or, alternatively, a spring biased type of actuation may be utilized.

SUMMARY OF THE PRESENT INVENTION

The present invention provides an engine air cut-off device which overcomes many of the problems of the prior art. In particular the present invention utilizes at least one actuating piston, the actuating piston being incorporated into the gate of the shut-down device. Thus it is possible to achieve a compact device which is easily assembled and which is smooth in its actuation. In addition the present invention provides mechanism for accomodating minor misalignment between the operating portions thereof, in particular between the elements which connect the source of pressurized fluid with the actuating piston and cylinder arrangements. Also, antivibration means are provided in the housing of the present invention in order to reduce any wear or jamming possibilities.

Broadly speaking, the present invention provides a cut-off device for an engine air manifold which comprises a valve body having a passage arranged for alignment with a corresponding passage in an engine manifold, a gate reciprocally mounted in the body and having a path of movement across the valve body passage, the gate having a closed position fully blocking the valve body passage and a retracted position fully opening the valve body passage, means biasing the gate to the retracted position and means for moving the gate from the retracted position to the closed position, the last-mentioned means including at least one cylindrical bore in the gate parallel to the path of movement, conduit means sealingly engaging the bore and adapted to introduce fluid under pressure into the bore and a piston face fixed in the bore against which face the fluid may react to drive the gate from the retracted position to the closed position.

DESCRIPTION OF THE PREFERRED EMBODIMENT

Figure 2:
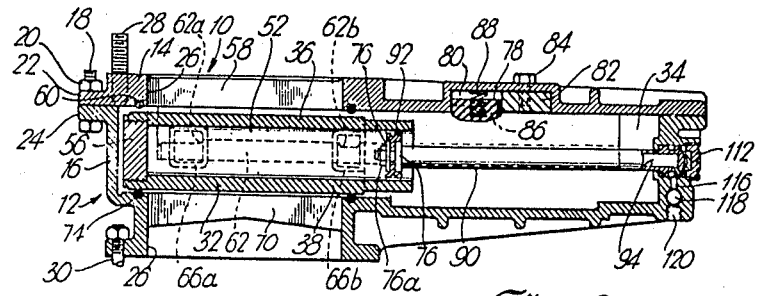
FIGS. 2 and 3 shows sections taken along the lines 2—2, 3—3, respectively in FIG. 1.
Figure 1:
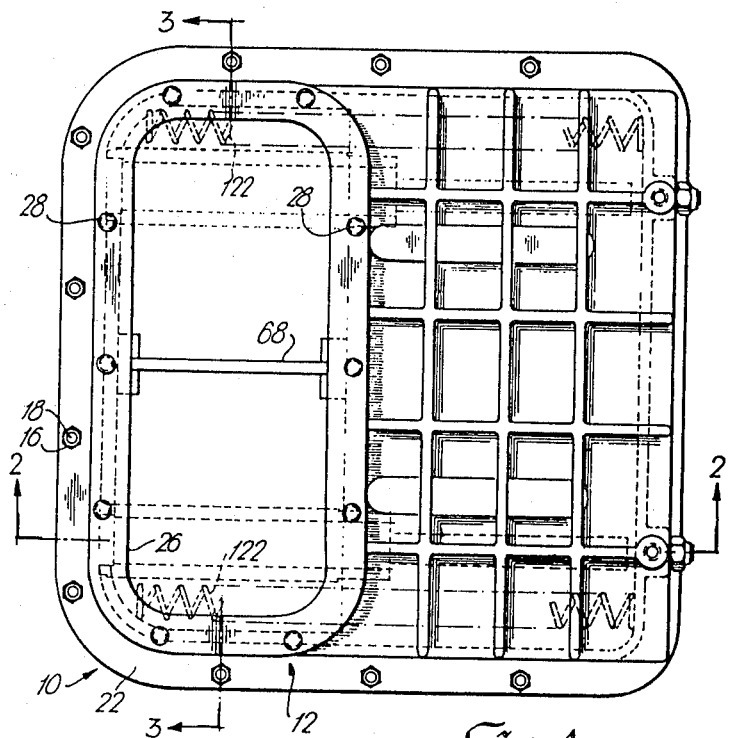
FIG. 1 shows a plan view of the engine air shut-off device of the present invention.

Reference is made to FIGS. 1 and 2 of the drawings wherein the engine air shut-off device 10 is shown. The device includes a main housing 12 which has upper and lower portions 14 and 16 respectively held together by a plurality of nuts 18 and bolts 20 arranged around the periphery and extending through mating outwardly projecting flanges 22 and 24 of the upper and lower sections 14 and 16 respectively. Each of these upper and lower sections is provided with generally rectangular opening 26, the upper and lower openings being in direct alignment with each other.

As indicated above the device of the present invention is intended for insertion in the manifold conduit or passage of an engine. To that end the upper housing section 14 is provided with a plurality of outwardly extending studs 28 arranged around the periphery of the upper opening 26, the studs being adapted to be received in corresponding bores in a flange defining one end of a manifold conduit section. Bolts 30 arranged around the periphery of the lower opening 26 can be used to clamp the flanged end of a second conduit section to the lower housing section 16. Thus, when the openings 26 are not blocked there will be a free flow of gases through the manifold conduits and the openings 26.

The openings 26 can be blocked by a reciprocable gate 32 which is receivable in a chamber 34 defined between the upper and lower housing portions. When the gate is in the position found in FIG. 2 it blocks the openings 26, thereby preventing the flow of gases along the manifold conduit. Retraction of the gate into the chamber 34 permits the free flow of gases through the conduits and the openings.

Figure 3:
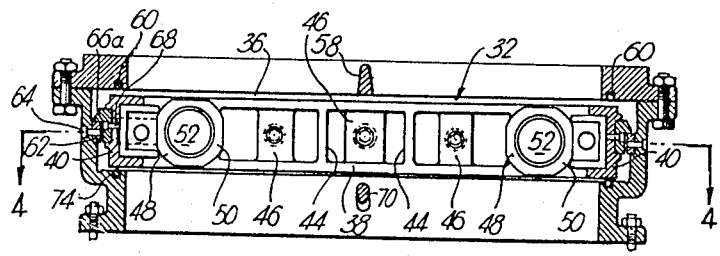
Figure 4:
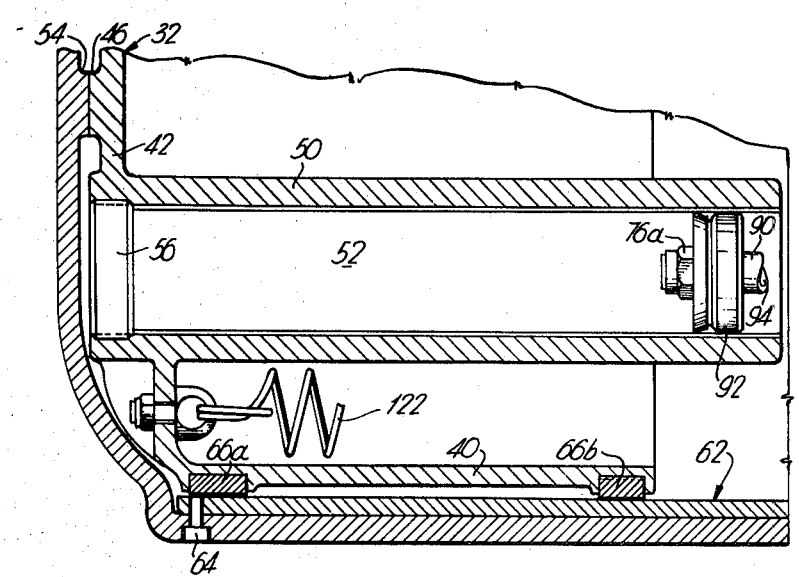
FIG. 4 is a partial section of the gate used in the present invention and taken along the line 4—4 of FIG. 3.
Figure 5:
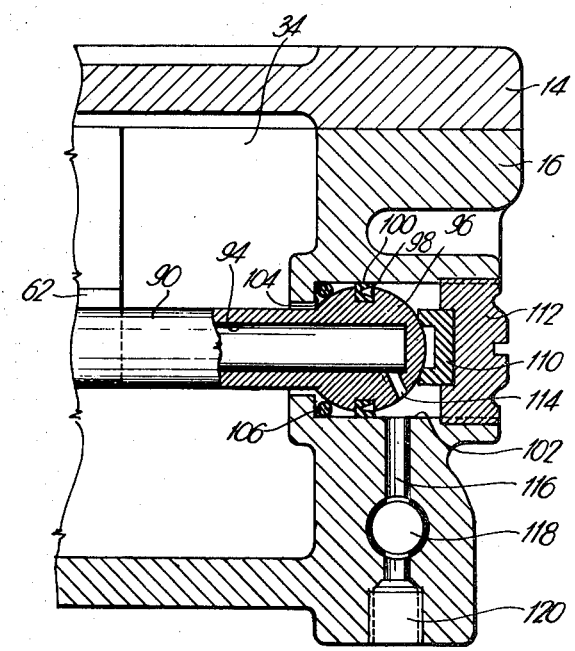
FIG. 5 shows an enlargement of the rod end construction found in FIG. 2.

The gate is shown in greater detail in FIGS. 2, 3 and 4 wherein it is seen to have upper and lower surfaces 36 and 38 respectively, side surfaces 40 and a front end surface 42. Extending longitudinally of and bridging the distance between the upper and lower surfaces 36 and 38 are strengthening ribs 44. Adjacent each side surface 40 are a pair of semi-cylindrical ribs 48 and 50 which define therebetween a cylindrical bore 52 parallel to the side surfaces 40. As seen in FIG. 4 the forward end wall 42 which would normally close the cylindrical bore 52 has been replaced by a threaded plug 56 which is received in a threaded portion of the bore. End surface 42 is also provided with a plurality of forwardly projecting surfaces 46 which serve as stops for the gate when it blocks passage 26. The gate stops engage similar projections 54 on the valve body.

Spanning the upper opening 26 is a central rib 58 while a central rib 70 spans the lower opening 26. the ribs 58 and 70 serve to strengthen the housing in the vicinity of the opening.

FIGS. 2, 3 and 4 show in some detail the guiding mechanism for the gate which mechanism allows the gate to move into its blocking position without contacting lower seal 74 (to be described hereinafter). The mechanism includes for each side of the gate, a guide strip 62 attached to the inside of lower valve body 16 as by machine screws 64. At the forward end, the strip includes a depression 62a and at an intermediate zone it includes a second depression 62b. Attached to each side of the gate, adjacent the front and rear surface are slide or guide pads 66a and 66b, respectively, connected to the gate as by machine screws 68. Pad 66a is longer than pad 66b and depression 62a is longer than depression 62b, thereby avoiding the possibility of pad 66a dropping into depression 62b as the gate is in its sliding mode.

FIG. 2 illustrates other aspects of the construction of the present invention. In particular O-ring type seals 60 and 74 are provided adjacent the upper and lower openings 26 respectively. The seal 74 is in a position such that it is contacted by the lower surface 38 of the gate 32 when the gate is in its blocking position. The upper seal 60 provides a seal against gases which might result from a back-fire contact between the upper surface 36 of the gate and seal 60 prevents such gases from getting past the gate and escaping through the engine's air filter to the outside environment. Directly above the floor of chamber 34 is a pressure block 78 contained in a cavity 80 within the upper housing section 14. The block 78 may be retained within cavity 80 in any convenient manner, one of which could involve the use of a block 82 held in place within the cavity 80 via a threaded bolt 84. Projecting forwardly of the block 82 could be a pair of arms 86 defining a space therebetween. Block 78 could have a "T"-shaped cross-section so that the arms of the "T" rest on the arms 86 with the leg of the "T" being positioned in the space between the arms and projecting downwardly. A downwards bias may be provided by the compression spring 88, against which block 78 may be moved due to engagement of block 78 with the upper surface 36 of the gate.

Conduit means are provided in order to supply fluid under pressure to the cylinder bore 52, the means including a cylindrical rod 90 terminating in an annular cup-seal 92 which is received in bore 52 with a sealingly slidable fit. Seal 92 is clamped between washers 72 and 76 and held in place by a nut 76a threaded to the end of rod 90. Extending the length of rod 90 is a central longitudinal bore 94 which communicates with the bore 52. At the opposite end of rod 90 to seal 92 is a generally spherical enlargement 96 having an annular groove 98 which receives an elastomeric seal 100. Enlargement 96 is received in a cavity 102 formed in the back wall of lower body section 16, the cavity having an inner face 104 against which an O-ring seal 106 is forced by enlargement 96. A pivot washer 110, which may be formed of polytetrafluoroethylene, is held in position abutting the spherical end of rod 90 by a threaded plug 112, threaded into cavity 102. Finally, it is seen that enlargement 96 has a bore 114 therein which communicates cavity 102 with bore 94 in the rod 90.

A bore 116 in lower valve body 16 leads from cavity 102 to bores 118 and 120 which eventually may be connected to the source of pressurized fluid, with any type of conventional connection being suitable.

The above discussion has dealt with the structure which is utilized to drive the gate from its retracted position to the closed position and this operation will be described more fully hereinafter. Drive for returning the gate from the closed to the retracted position may be provided by a pair of tension springs 122 anchored at one end to the front wall 42 of the gate and at the other end to the back wall of the lower housing section 16. Each spring would pass along the appropriate cavity formed in the gate by walls 40 and 48.

The operation of the present invention will now be described.

In a non-emergency situation the gate 32 is held in its retracted position in the chamber 34. The gate is held in this position by the tension springs 122 as well as by the biasing forces provided by the biasing block 78. Vibration of the gate is, of course, greatly reduced through the biasing action of the block 78 towards the floor of section 16 causing tight engagement of pads 66a and 66b against guide strip 62. When an engine emergency is detected remote from the device of the present invention an actuating fluid under pressure is introduced into the two cylinders 52. The fluid under pressure passes through the bores 120 and 118 in the lower body section 16 into cavity 102 and through the bore 114 to bore 94 in rod 90. The fluid under pressure thus passes along bore 94 into the cylindrical bore 52 and acts against the plug 56. The increase in pressure in the cylindrical bore 52 drives the gate from its retracted position to the closed position wherein it blocks the openings 26 to thereby restrict the flow of induction gases through the manifold conduit, hence stopping the engine. The movement of the gate 32 is dampened via spring forces and when the gate is in its closed position it is sealed with respect to the manifold conduit via O-ring seal 74. If the seal were not provided by the O-ring 74 induction gases could pass by the gate and thereby prevent a total shut-down of the engine.

Once the emergency situation has been overcome the pressure transmitted by the fluid is reduced and the tension springs 122 are thereby able to exert their restoring forces whereby the gate is moved from its closed position to its retracted position.

It is therefore seen that the present invention provides a very effective engine shut-off device which is especially compact in nature due to the incorporation of the pressure cylinders 52 into the gate 32 as an integral part thereof. The overall device is of a relatively simple nature and is easily manufactured. Provision has been made to ensure that there will be a minimum of wear during operation of the device and in addition care has been taken to ensure that the moving parts of the apparatus are well guided and hence the chances of a jamming condition are greatly reduced.

In addition to the above advantages it is seen that the resilient mounting of rod 90 in lower body section 16 in combination with the resilient seal surrounding rod 90 in bore 52 permits some angular misalignment of rod 90 with respect to the gate without hindering the operability of the gate.

Figure 7:
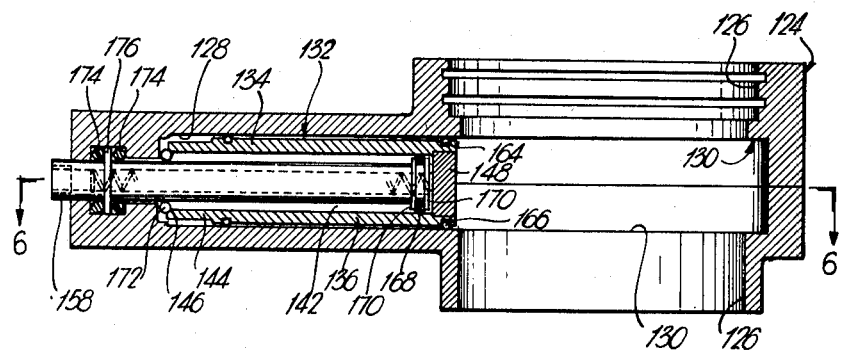
FIG. 7 shows a section along the line 7—7 of FIG. 6.
Figure 6:
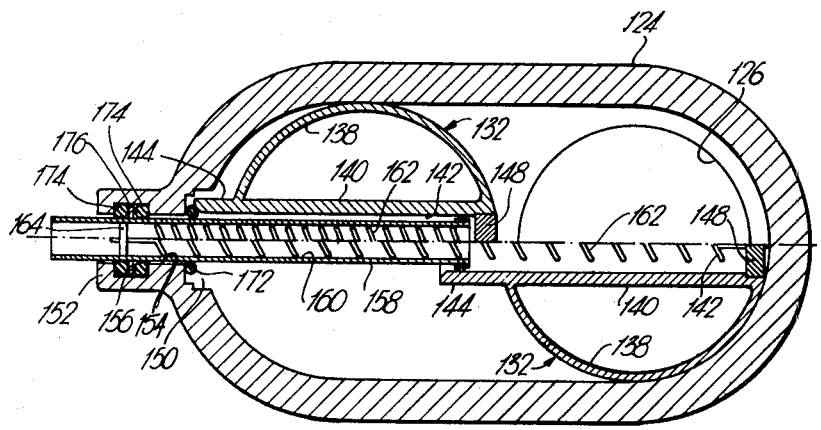
FIG. 6 shows a section along the line 6—6 from FIG. 7, illustrating closed and open positions of a second embodiment.

A second, simpler version of the present invention is illustrated in FIGS. 6 and 7. This particular embodiment is useful in engines having smaller diameter intake ducts and may be especially useful in mobile rather than stationary power plants.

FIG. 6 shows a section along the line 6—6 of FIG. 7, the portion of FIG. 6 above the center line showing the gate retracted and the lower portion of FIG. 6 showing the gate in its blocking position. The valve includes a valve body 124 having a passageway 126 therethrough for the normal passage of engine gases. Means (not shown) may be employed to fix the valve body in an appropriate location on the engine manifold.

Valve body 124 has a central cavity 128 which is generally rectangular in plan and elevation but has rounded, semi-circular ends in plan, the radius of the end portions being greater than that of passageway 126 whereby shoulders 130 are created about the circumference of passageway 126.

Located within cavity 128 is the gate 132 which is generally circular in plan having upper, lower and circumferential surfaces 134, 136 and 138 respectively. Extending axially of the gate is a cylindrical wall 140 defining a bore 142 therein. Wall 140 extends beyond the circumferential wall 138 as at 144 and the extension has a bevelled inner edge 146. At the opposite end bore 142 is plugged by a plug member 148 which may be held in place by interengaging threads. Extension 144 is adapted to rest within a circular cavity 150, extending into the valve body 124 from the main central cavity 128.

Valve body 124 is also provided with an external extension 152 which in turn has a bore 154 communicating with cavity 150. A circular recess 156 is formed within extension 152 so as to open out onto bore 154. Bore 154 receives an annular conduit or rod 158 having an internal bore 160, rod 158 extending into cavity 128 a distance approximately equal to the length of bore 142. As seen from both FIGS. 6 and 7 when the gate is retracted rod 158 will be positioned within bore 142.

Internally, rod 158 carries a helical tension spring 162 which is anchored at one end to the gate plug 148 and at its other end to an abutment 164 held within rod 160. Abutment 164 is formed and positioned so as to cause minimum interference to fluids flowing in bore 160.

Since the cut-off device of the present invention is used to cut-off gas flows and since it depends on pressurized fluid for actuation it is necessary to provide sufficient sealing. Thus gate 132 is provided with O-ring seals 164 and 166 in the top and bottom surfaces 134 and 136 respectively. When the gate is in the blocking position seals 164, 166 will be able to contact shoulders 130, 130 to prevent gases from blowing by the gate. Rod 158 is sealed with respect to gate bore 142 by an annular resilient cup seal 168 held in place by a pair of annular members or washers 170 affixed to the rod 158.

Other resilient members utilized include an O-ring bumper 172 surrounding rod 158 at the end of cavity 150 and adapted to engage bevelled edge 146 of gate extension 144 to prevent contact between extension 144 and the cavity end wall. Also utilized is a pair of O-rings 174 positioned in recess 156 on either side of a washer member 176 affixed to rod 158. This permits rod 158 to be generally self-aligning with bore 142, thereby permitting slight movement of rod 158 without interfering with the operability of the gate.

The principle of operation of this embodiment is essentially the same as for the first embodiment. When necessary to block the passageway 126 fluid underpressure, such as compressed air is introduced into bore 160 of rod 158 to act on plug member 148. The forces produced by the pressurized fluid drive the gate from its retracted position (upper portion of FIG. 6) to its blocking position (lower portion of FIG. 6). In the blocking position spring 162 is stretched and hence when the fluid pressure is relaxed the spring forces will retract the gate to its rest position.

The above description is intended to relate to the best mode of putting the present invention into effect. It is certainly recognized that other practioners in the art may deviate from the exact structure as indicated above without departing from the spirit of invention. Other alternative constructions are possible without alerting the spirit of the invention. The scope of protection to be afforded the present invention is to be determined only from the appended claims.

The embodiments of the invention in which an exclusive property or privilege is claimed are defined as follows:

1. A cut-off device for an engine air manifold comprising a valve body having a generally cylindrical passage therethrough arranged for alignment with a corresponding passage in an engine air manifold, a cavity in said valve body opening into said valve body passage, a generally circular gate movably contained in said valve body and having a path of movement across said valve body passage extending from a normally retracted position with said gate fully housed in said cavity so as to maintain said valve body passage normally fully open, to a closed position with said gate fully blocking and sealing said valve body passage, a cylindrical bore in said gate axially aligned with said path of movement, said bore being closed at one end by an end face and being open at the other end, a hollow rod resiliently mounting said rod at one end in said valve body coaxial with, extending through said cavity into the open other end of and sealingly engaging said cylindrical bore, wherein said mounting means includes an annular enlargement on said rod and a pair of annular resiliant mounting members located in a recess of said valve body, said enlargement being positioned between said mounting members, a tension spring located in the interior of said hollow rod with one end attached to said end face and the other end thereof anchored in said rod adjacent the one end thereof, said spring biasing said gate to its normal retracted position, and means for introducing fluid under pressure into said bore via said hollow rod whereby the fluid may react against said end face to drive the gate from the retracted position to the closed position.

2. The cut-off device of claim 1 wherein said gate includes circular opposed major surfaces and a generally cylindrical peripheral surface, and resilient seal means positioned adjacent the periphery of and in each major surface, engageable with a corresponding shoulder surrounding said valve body passage when in the closed position to prevent leakage of gases past the closed gate.

* * * * *